United States Patent
Komori

(10) Patent No.: US 11,257,111 B2
(45) Date of Patent: Feb. 22, 2022

(54) CONTENT OUTPUT SYSTEM, TERMINAL DEVICE, CONTENT OUTPUT METHOD, AND RECORDING MEDIUM

(71) Applicant: SONY CORPORATION, Tokyo (JP)

(72) Inventor: Akihiro Komori, Tokyo (JP)

(73) Assignee: SONY CORPORATION, Tokyo (JP)

(*) Notice: Subject to any disclaimer, the term of this patent is extended or adjusted under 35 U.S.C. 154(b) by 114 days.

(21) Appl. No.: 16/319,368

(22) PCT Filed: Apr. 24, 2017

(86) PCT No.: PCT/JP2017/016204
§ 371 (c)(1),
(2) Date: Jan. 21, 2019

(87) PCT Pub. No.: WO2018/020764
PCT Pub. Date: Feb. 1, 2018

(65) Prior Publication Data
US 2020/0160378 A1    May 21, 2020

(30) Foreign Application Priority Data
Jul. 28, 2016  (JP) .............................. JP2016-148322

(51) Int. Cl.
*G06Q 30/00*    (2012.01)
*G06Q 30/02*    (2012.01)
(Continued)

(52) U.S. Cl.
CPC ..... *G06Q 30/0246* (2013.01); *G06K 9/00778* (2013.01); *G06K 9/00885* (2013.01);
(Continued)

(58) Field of Classification Search
CPC ........... G06Q 30/0246; G06Q 30/0238; G06Q 30/0261; G06Q 30/02; H04B 17/318;
(Continued)

(56) References Cited

U.S. PATENT DOCUMENTS

| | | | |
|---|---|---|---|
| 9,082,136 B1* | 7/2015 | Hewinson | G06Q 30/0269 |
| 2004/0243519 A1* | 12/2004 | Perttila | G06Q 20/425 |
| | | | 705/75 |

(Continued)

FOREIGN PATENT DOCUMENTS

| | | |
|---|---|---|
| JP | 2002-109386 A | 4/2002 |
| JP | 2012-520018 A | 8/2012 |

(Continued)

OTHER PUBLICATIONS

International Search Report and Written Opinion of PCT Application No. PCT/JP2017/016204, dated Aug. 1, 2017, 08 pages of ISRWO.

(Continued)

*Primary Examiner* — Yehdega Retta
(74) *Attorney, Agent, or Firm* — Chip Law Group

(57) ABSTRACT

There is provided a content output system, a terminal device, a content output method, and a recording medium which can increase accuracy in measurement of a degree of attention to content. A content output system including a communication unit which receives a signal from a surrounding user device, an output unit which outputs content, and a control unit which determines, on the basis of user state data indicating a state of a user corresponding to a user device, which is included in a broadcast signal from the user device, that the user corresponding to the user device is paying attention to content output by the output unit when a radio wave intensity of the received signal is equal to or higher than a predetermined value.

18 Claims, 14 Drawing Sheets

(51) Int. Cl.
  *H04B 17/318* (2015.01)
  *G06K 9/00* (2022.01)
(52) U.S. Cl.
  CPC ..... *G06Q 30/0238* (2013.01); *G06Q 30/0261* (2013.01); *H04B 17/318* (2015.01); *G06K 2009/00939* (2013.01)
(58) Field of Classification Search
  CPC .......... G06K 9/00778; G06K 9/00885; G06K 2009/00939; G06K 9/00335; G06K 9/00362; G06K 9/00288; G06K 9/00302; H04N 21/442; H04N 21/458; G09F 19/00
  See application file for complete search history.

(56) References Cited

U.S. PATENT DOCUMENTS

| | | | | |
|---|---|---|---|---|
| 2009/0197616 | A1* | 8/2009 | Lewis | H04M 3/4878 455/456.1 |
| 2010/0138285 | A1 | 6/2010 | Leonard et al. | |
| 2011/0035282 | A1* | 2/2011 | Spatscheck | G06Q 30/0273 705/14.58 |
| 2013/0165151 | A1* | 6/2013 | Gits | H04W 4/023 455/456.3 |
| 2014/0172579 | A1* | 6/2014 | Peterson | G06Q 30/0269 705/14.66 |
| 2014/0325540 | A1* | 10/2014 | Garza | H04N 21/8126 725/12 |
| 2014/0358685 | A1* | 12/2014 | Want | G09F 27/00 705/14.58 |
| 2014/0379485 | A1* | 12/2014 | Goswami | H04H 60/37 705/14.66 |
| 2015/0046269 | A1* | 2/2015 | Liu | G06Q 30/0275 705/14.71 |
| 2019/0191205 | A1* | 6/2019 | DeLorme | H04N 21/8547 |

FOREIGN PATENT DOCUMENTS

| | | |
|---|---|---|
| JP | 2013-125047 A | 6/2013 |
| JP | 2014-021677 A | 2/2014 |
| JP | 2014-089501 A | 5/2014 |
| JP | 2016-026673 A | 2/2016 |
| JP | 2016-062273 A | 4/2016 |
| JP | 2016-095741 A | 5/2016 |
| JP | 5919403 B1 | 5/2016 |
| WO | 2010/065768 A1 | 6/2010 |

OTHER PUBLICATIONS

Office Action for JP Patent Application No. 2018-529365, dated May 25, 2021, 3 pages of Office Action and 02 pages of English Translation.

* cited by examiner

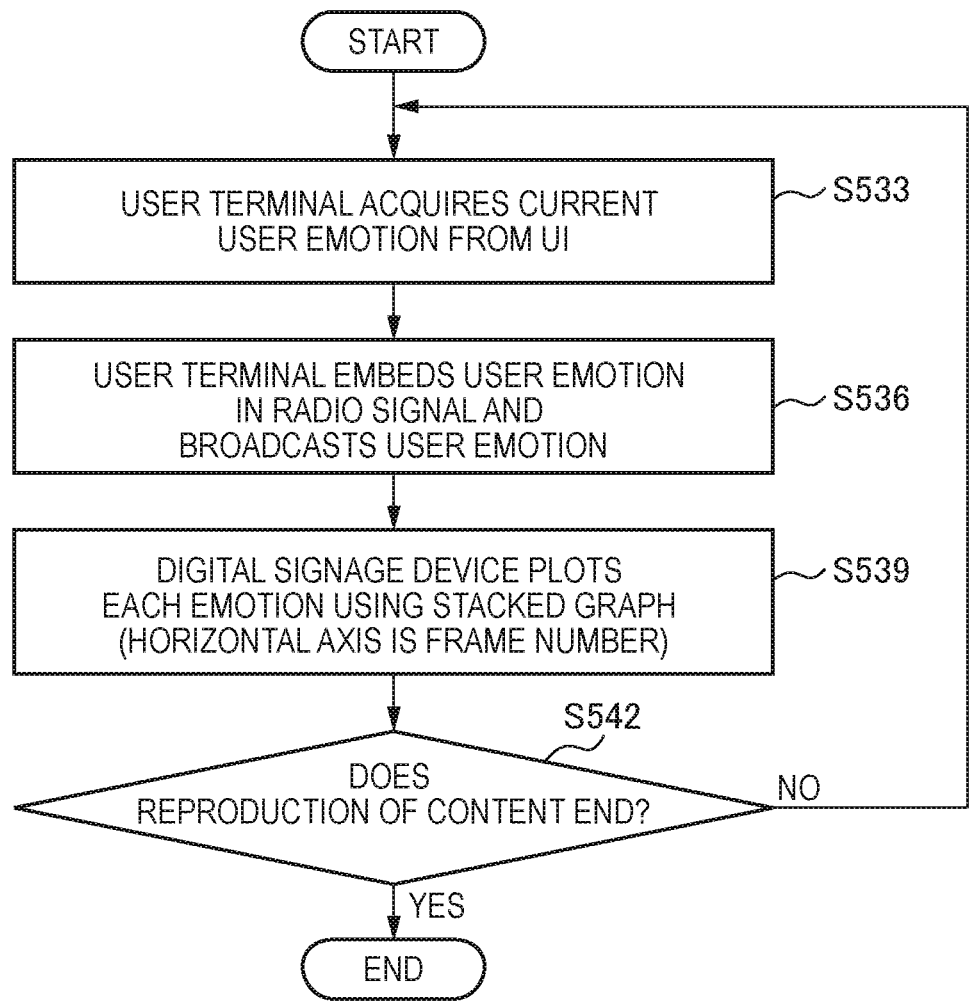

CONTENT OUTPUT SYSTEM, TERMINAL DEVICE, CONTENT OUTPUT METHOD, AND RECORDING MEDIUM

CROSS REFERENCE TO RELATED APPLICATIONS

This application is a U.S. National Phase of International Patent Application No. PCT/JP2017/016204 filed on Apr. 24, 2017, which claims priority benefit of Japanese Patent Application No. JP 2016-148322 filed in the Japan Patent Office on Jul. 28, 2016. Each of the above-referenced applications is hereby incorporated herein by reference in its entirety.

TECHNICAL FIELD

The present disclosure relates to a content output system, a terminal device, a content output method, and a recording medium.

BACKGROUND ART

In the related art, a digital signage which is a public display that is installed in public places, and performs a display such as that of an advertisement is known.

Measurement of a degree of attention paid to a digital signage is performed by analyzing an image acquired by a camera, a laser range finder, or the like installed in the vicinity, and is performed on the basis of a touch operation on the digital signage, for example. In addition, the degree of attention may also be measured by displaying a QR code (registered trademark) on the digital signage, the QR code being photographed using a user terminal, and analyzing the history of access to a predetermined URL. In addition, there is a method such as receiving information such as iBeacon and GPS using a user terminal and estimating the degree of attention by matching the received information with a database on a cloud side, or counting using human effort, and the like.

With regard to a digital signage, for example, Patent Literature 1 to be described below discloses that a positional relationship with respect to a digital signage is recognized on the basis of data obtained by a camera in a mobile phone. In addition, Patent Literature 2 to be described below discloses that a position of a user with respect to a display device is detected, identification of a user is performed on the basis of user identification information acquired from a user terminal, and information in which a user is likely to be interested is displayed at a position which the user can easily see. Moreover, Patent Literature 3 to be described below discloses an outdoor display board device in which a screen display changes if a customer approaches and detailed information required by the customer can be presented.

CITATION LIST

Patent Literature

Patent Literature 1: JP 2012-520018T
Patent Literature 2: JP 2014-89501A
Patent Literature 3: JP 2002-109386A

DISCLOSURE OF INVENTION

Technical Problem

However, optical-based sensors such as a camera have problems of having weaknesses in response to change in lighting conditions, rain, snow, and occlusion. In addition, there are problems that a user's active operation is required in a case of using a sensor for contact or proximity system, and that time and effort for opting in to a cloud service or setting connection information in advance are required in a case of using iBeacon or GPS.

As described above, conventional methods of measuring a degree of attention described above have problems such as low accuracy or there being a burden on a user.

Therefore, in the present disclosure, a content output system, a terminal device, a content output method, and a recording medium which can increase accuracy in measurement of a degree of attention to content are proposed.

Solution to Problem

According to the present disclosure, there is proposed a content output system including: a communication unit which receives a signal from a surrounding user device; an output unit which outputs content; and a control unit which determines, on the basis of user state data indicating a state of a user corresponding to a user device, which is included in a broadcast signal from the user device, that the user corresponding to the user device is paying attention to content output by the output unit when a radio wave intensity of the received signal is equal to or higher than a predetermined value.

According to the present disclosure, there is proposed a terminal device including: a communication unit which transmits a broadcast signal; a sensor which senses a state of a user and generates sensing data; and a control unit which performs control to generate user state data on the basis of the sensing data generated by the sensor, and to embed the user state data in the broadcast signal and broadcast the broadcast signal via the communication unit.

According to the present disclosure, there is proposed a content output method including, by a processor: outputting content from an output unit; and determining, on the basis of user state data indicating a state of a user corresponding to a user device, which is included in a broadcast signal from the user device, that the user corresponding to the user device is paying attention to content output by the output unit when a radio wave intensity of a signal received by a communication unit which receives a signal from a surrounding user device is equal to or higher than a predetermined value.

According to the present disclosure, there is proposed a storage medium having a program recorded thereon, the program causing a computer to function as a communication unit which transmits a broadcast signal, a sensor which senses a state of a user and generates sensing data, and a control unit which performs control to generate user state data on the basis of the sensing data generated by the sensor, and to embed the user state data in the broadcast signal and broadcast the broadcast signal via the communication unit.

Advantageous Effects of Invention

According to the present disclosure described above, it is possible to increase accuracy in measurement of a degree of attention to content.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 15 is a flowchart which shows a process of generating a graph showing a change in user emotion according to a second modified example of the present embodiment.

MODE(S) FOR CARRYING OUT THE INVENTION

Figure 1:
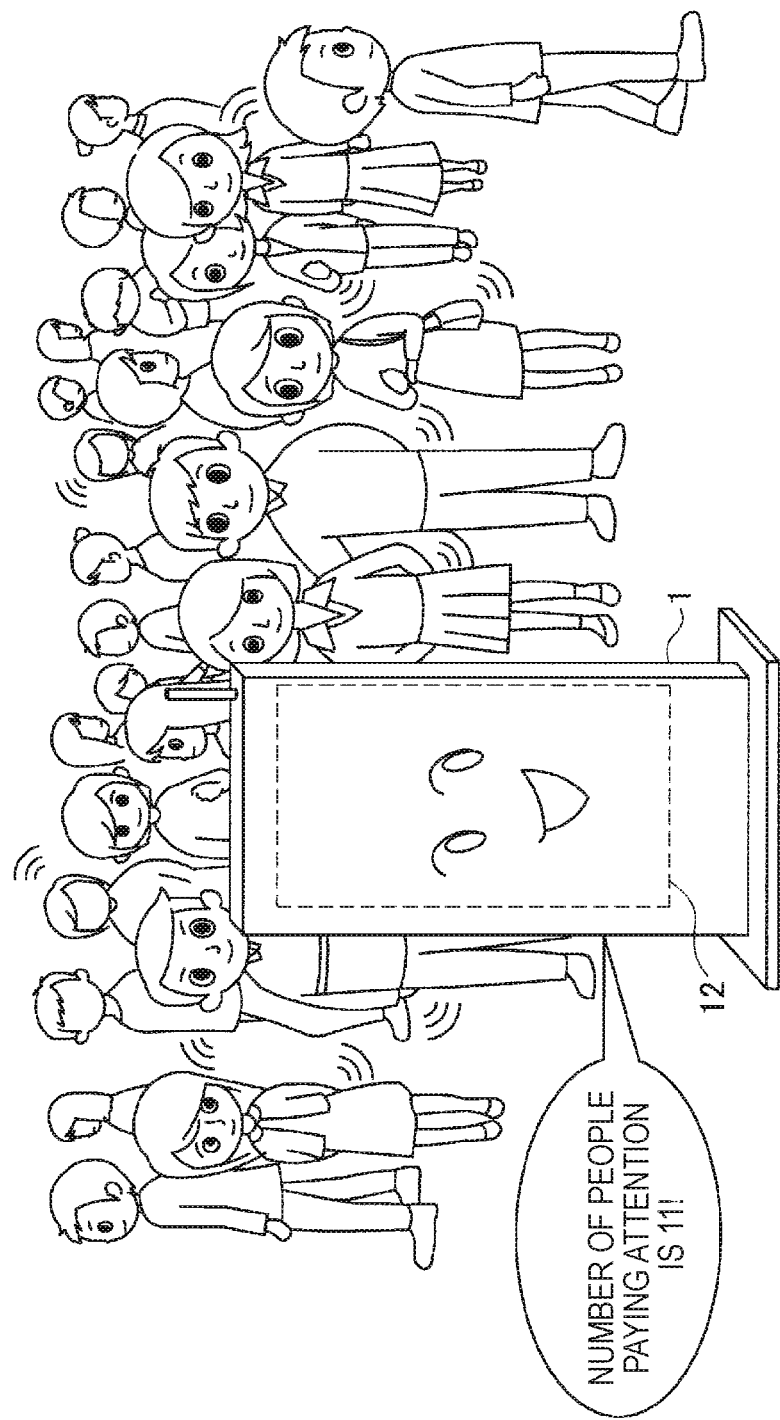
FIG. 1 is a diagram which describes an overview of an information processing system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.
1. Overview of information processing system according to one embodiment of the present disclosure
2. Configuration
2-1. Configuration of digital signage device
2-2. Configuration of user terminal
3. Operation process
3-1. First operation process
3-2. Second operation process
3-3. Third operation process
3-4. Fourth operation process
3-5. Supplement
4. Conclusion

1. OVERVIEW OF INFORMATION PROCESSING SYSTEM ACCORDING TO ONE EMBODIMENT OF THE PRESENT DISCLOSURE

FIG. 1 is a diagram which describes an overview of an information processing system according to one embodiment of the present disclosure. As shown in FIG. 1, in an information processing system according to the present embodiment, it is possible to measure degrees of attention of multiple users to a digital signage device 1 which is installed publicly as an electric advertisement signboard in real time without using at least an optical-based sensor such as a camera or a laser range finder, a sensor for contact or proximity system, or the like.

(Background)

As described above, a method of measuring a degree of attention to content output to a digital signage has problems that an optical-based sensor is sensitive to change in lighting conditions, rain, snow, or occlusion, that a sensor for contact or proximity system needs active operations, and that time and effort such as opt-in to a cloud service or setting connection information in advance are required in the case of using iBeacon or GPS.

In addition, in any sensing method, a change of content in accordance with a change or state of a user may not be able to be sufficiently realized without decreasing the size a detection area or ascertaining the behavior of a user before and after paying attention to the digital signage. That is, at a next moment at which a user wants to know the details, the content may have changed to other content, and an opportunity loss such as sufficient information not being transmitted may occur.

Therefore, in the information processing system according to the present embodiment, it is possible to increase accuracy in measurement of a degree of attention to content by determining whether or not a user is paying attention to content on the basis of data indicating the state of the user included in a broadcasting signal (a broadcast radio signal) from a user terminal.

The broadcast signal from a user terminal is, for example, a probe request used in wireless LAN communication (a connection request signal for pairing with an access point) or an advertising packet used in Bluetooth (a registered trademark) communication a signal for notifying the existence of itself to the surroundings, for example, including terminal identification information or data information), and the data such as motion sensor data indicating the state of the user is embedded in these radio signals in the present embodiment. As shown in FIG. 1, the digital signage device 1 can receive a broadcast signal transmitted from a user terminal (a mobile communication terminal such as a smartphone or a wearable terminal) carried by a surrounding user to analyze motion data, and measure a degree of attention of the user in real time by recognizing that the user has stopped in the vicinity of the digital signage device 1. The digital signage device 1 can output, for example, content from the display unit 12, and determine a degree of attention to the content.

The digital signage device 1 may recognize a degree of attention of a user using, for example, the number of people paying attention. In addition, the digital signage device 1 can also switch content to be output to more detailed content in accordance with the attention of a user.

As described above, the information processing system according to one embodiment of the present disclosure has been described. Subsequently, a specific configuration example of each device included in the information processing system according to the present embodiment and an operation process of the present embodiment will be described with reference to drawings.

2. CONFIGURATION

<2-1. Configuration of Digital Signage>

Figure 2:
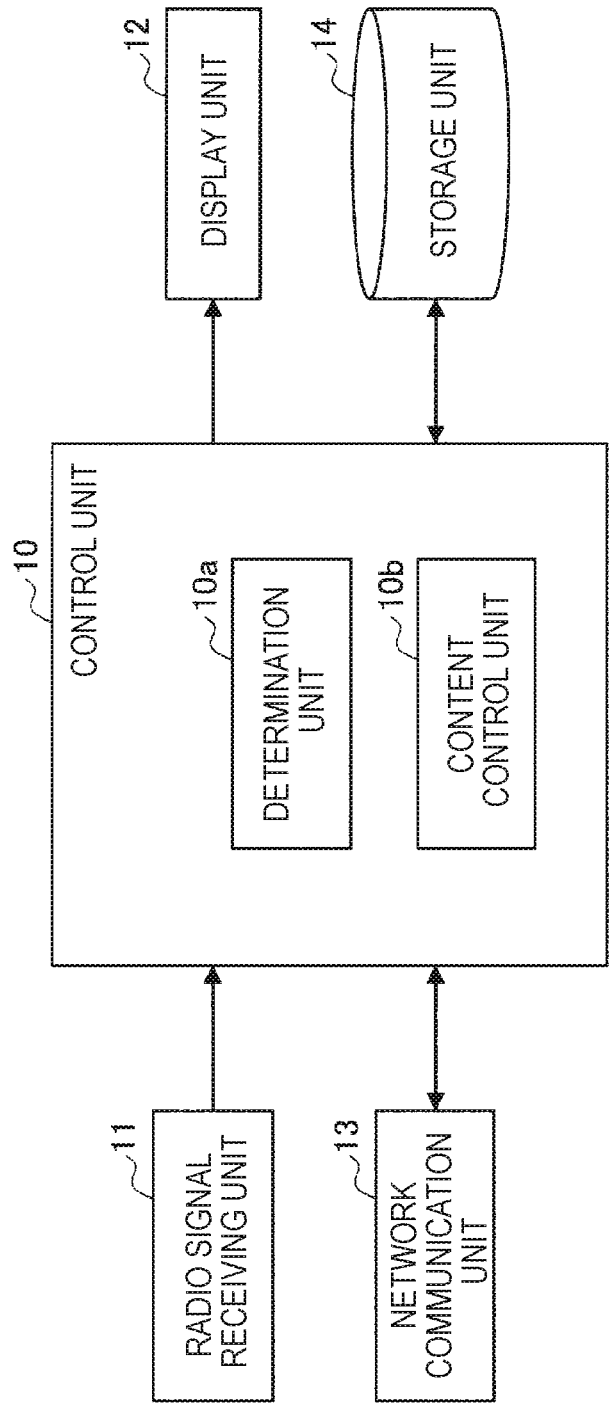
FIG. 2 is a block diagram which shows an example of a configuration of a digital signage device according to the present embodiment.

FIG. 2 is a block diagram which shows an example of a configuration of the digital signage device 1 according to the present embodiment. As shown in FIG. 2, the digital signage device 1 includes a control unit 10, a radio signal receiving unit 11, a display unit 12, a network communication unit 13, and a storage unit 14.

The control unit 10 functions as an arithmetic processing device and a control device, and controls overall operations in the digital signage device 1 according to various programs. The control unit 10 is realized by an electronic circuit such as a central processing unit (CPU) and a microprocessor, for example. In addition, the control unit 10 may also include a read only memory (ROM) that stores programs for use, arithmetic parameters, and the like, and a random access memory (RAM) that temporarily stores appropriately changing parameters and the like.

In addition, the control unit 10 according to the present embodiment functions as a determination unit 10*a* and a content control unit 10*b*.

Figure 3:
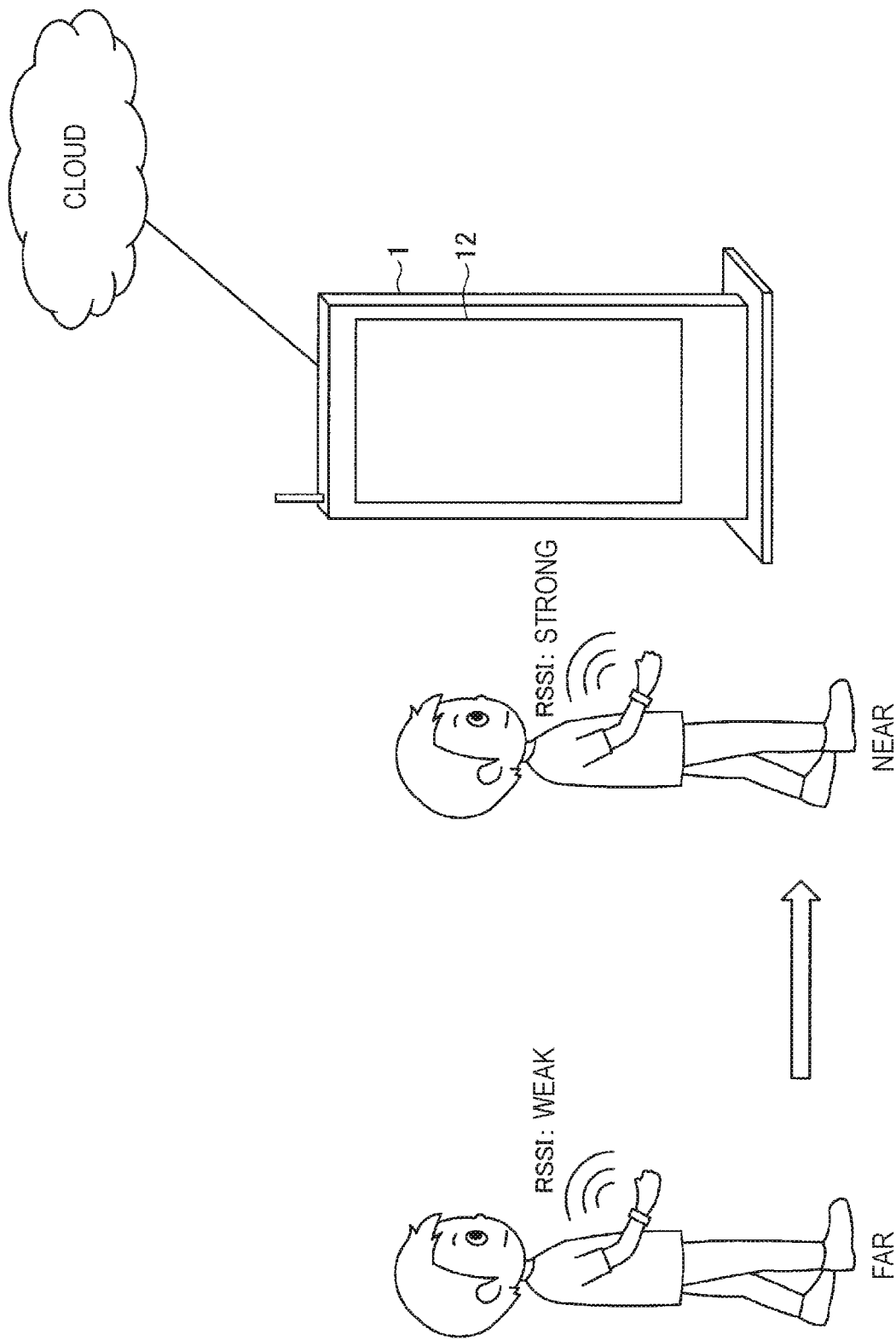
FIG. 3 is a diagram which describes a relationship of a distance between a digital signage device and a user terminal and a radio wave intensity of the user terminal according to the present embodiment.

The determination unit 10*a* has a function of determining a user's attention to content. For example, when a radio wave intensity received by the radio signal receiving unit 11 is greater than or equal to a predetermined value, the determination unit 10*a* may determine whether or not the user is paying attention to content on the basis of user state data (specifically, for example, motion sensor data) included in a broadcast signal from the user terminal 2. Here, FIG. 3 shows a diagram which describes a relationship of a distance between the digital signage device 1 and the user terminal 2 and the radio wave intensity of the user terminal 2. As shown in FIG. 3, if a user carrying the user terminal 2 approaches the digital signage device 1, since a received signal strength indicator (RSSI) of a radio signal increases, a distance between the digital signage and a user can be estimated from the RSSI of a radio signal. In a case in which a user is interested in the content being output to the display unit 12 of the digital signage device 1, the user approaches and stops at the digital signage device, and views the content. In addition, since user state data is embedded in a data row such as a probe request frame or an advertising packet, the digital signage device 1 can read user state data without a special connection procedure. The user state data may not be encrypted or may be encrypted by a prior agreement. Note that detailed content of a method of determining a user's attention by the determination unit 10*a* of the present embodiment will be described below using FIG. 5 and the like.

The content control unit 10*b* performs control such as changing content output to the display unit 12. The content may be stored in the storage unit 14, and may also be acquired form a cloud via a network (not shown) by the network communication unit 13. In addition, in the present specification, the content is not limited to images (still images, moving images) output from the display unit 12, and may also be audio output from a speaker (not shown) of the digital signage device 1. Moreover, it may be video data including image data and voice data.

The radio signal receiving unit 11 is a radio module which receives radio signals (referred to as broadcast signals in the present specification) broadcast from the surrounding user terminal 2. The digital signage device 1 having the radio signal receiving unit 11 functions as a master unit such as a wireless LAN access point, a Bluetooth master, or a central device in Bluetooth Low Energy (BLE). The digital signage device 1 functioning as such a master unit receives a broadcast signal such as a probe request or an advertising packet transmitted from the user terminal 2 which is a slave unit. Note that the digital signage device 1 is referred to as the "radio signal receiving unit 11" in the present embodiment, but may also have a function of transmitting a radio signal (a beacon and the like) when necessary (that is, it can function as a radio signal communication unit).

The display unit 12 is a display device that outputs content. This display unit 12 may also be, for example, a display device such as a liquid crystal display (LCD) or an organic electroluminescence (EL) display.

The network communication unit 13 is a communication module for connecting to a network (cloud) using wires or wirelessly to transmit or receive data. The network communication unit 13 communicates with a network using, for example, a wired local area network (LAN), a wireless LAN, Wireless Fidelity (Wi-Fi, a registered trademark), or the like.

The storage unit 14 is realized by a read only memory (ROM) that stores programs to be used in processes of the control unit 10, arithmetic parameters, and the like, and a random access memory (RAM) that temporarily stores appropriately changing parameters, and the like.

<2-2. Configuration of User Terminal>

Figure 4:
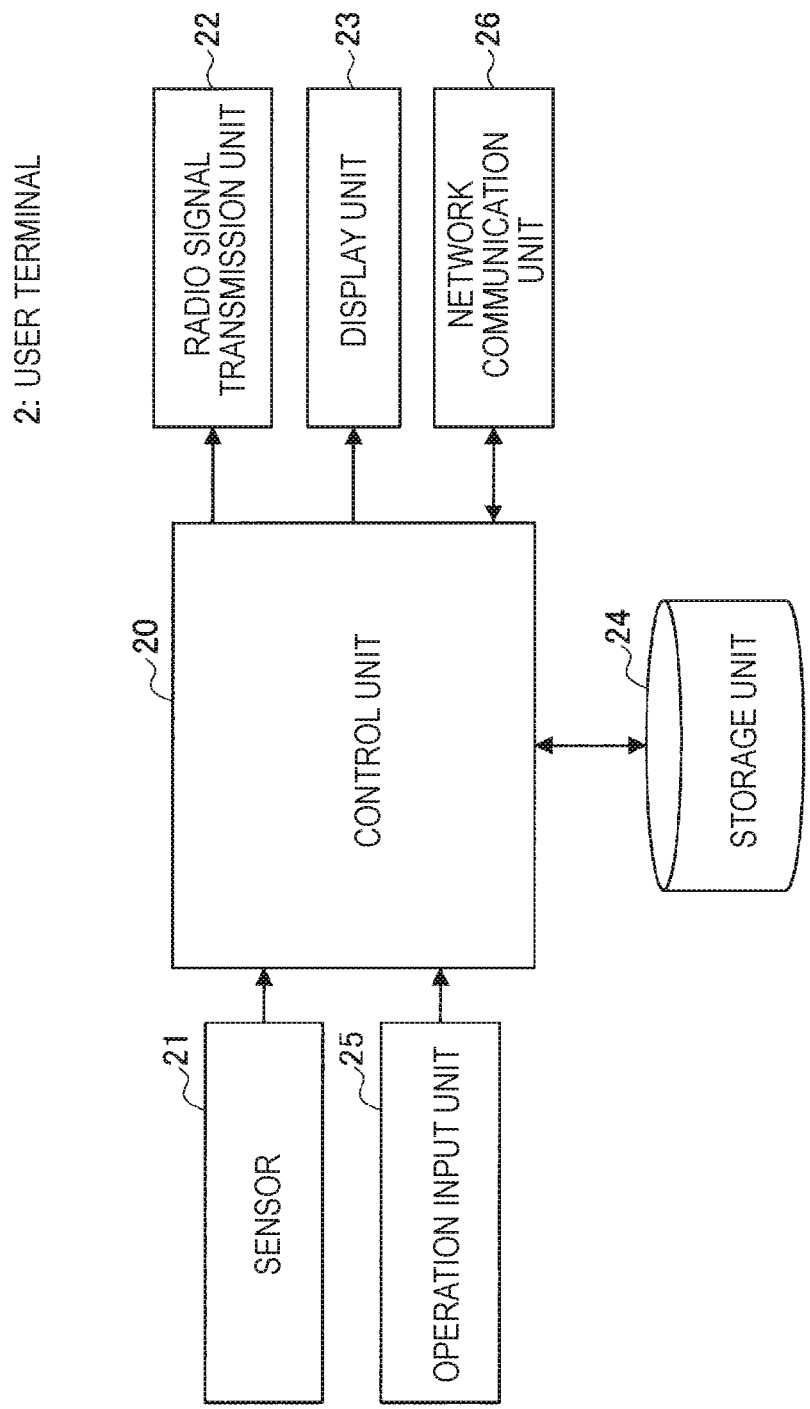
FIG. 4 is a block diagram which shows an example of a configuration of the user terminal according to the present embodiment.

FIG. 4 is a block diagram which shows an example of a configuration of the user terminal 2 according to the present embodiment. As shown in FIG. 4, the user terminal 2 has a control unit 20, a sensor 21, a radio signal transmission unit 22, a display unit 23, a storage unit 24, an operation input unit 25, and a network communication unit 26.

The control unit 20 functions as an arithmetic processing unit and a control unit, and controls an overall operation in the user terminal 2 according to various programs. The control unit 20 is realized by, for example, an electronic circuit such as a central processing unit (CPU) or a microprocessor. In addition, the control unit 20 may also include a read only memory (ROM) that stores programs to be used, arithmetic parameters, and the like, and a random access memory (RAM) that temporarily stores appropriately changing parameters, and the like.

In addition, the control unit 20 according to the present embodiment performs control such that sensor data obtained by the sensor 21 (user state data which indicates the state of a user in the present specification) is embedded in a radio signal and is broadcast from the radio signal transmission unit 22. Specifically, the control unit 20 performs a process of embedding sensor data in a data row such as a probe request frame or an advertising packet transmitted by the radio signal transmission unit 22. Moreover, the control unit 20 may write sensor data instead of an SSID in an SSID area included in the data row of a radio signal.

The sensor 21 has a function of detecting the state of a user. For example, the sensor 21 may be a motion sensor (an acceleration sensor, a gyro sensor, or a geomagnetic sensor) or a biological sensor (a heartbeat sensor, a pulse sensor, a perspiration amount sensor, a body temperature sensor, a blood pressure sensor, or an electroencephalogram sensor).

The radio signal transmission unit 22 is a radio module that broadcasts a radio signal. The user terminal 2 having the radio signal transmission unit 22 functions as a slave unit with respect to the digital signage device 1 functioning as a master unit, and transmits, for example, a probe request or an advertising packet. Note that the user terminal 2 is referred to as the "radio signal transmission unit 22" in the present embodiment, but may also have a function of receiving a radio signal (a beacon and the like) when necessary (that is, can function as a radio signal communication unit).

The display unit 23 is a display device which outputs screens of various types such as a menu screen and an operation screen. This display unit 23 may also be, for example, a display device such as a liquid crystal display (LCD) or an organic electroluminescence (EL) display.

The storage unit 24 is realized by a read only memory (ROM) that stores programs to be used in a process of the control unit 20, arithmetic parameters, and the like, and a random access memory (RAM) that temporarily stores appropriately changing parameters.

The operation input unit 25 detects an operation input by a user, and outputs a detected input signal to the control unit 20. This operation input unit 25 is realized by a touch panel, a switch, a button, or the like.

The network communication unit 26 is a communication module that is connected to the network (cloud) using wires or wirelessly to transmit or receive data. The network communication unit 26 communicates with the network using, for example, a wired local area network (LAN), a wireless LAN, Wireless Fidelity (Wi-Fi, a registered trademark), or the like.

As described above, the configuration of the user terminal 2 has been described. The user terminal 2 may be realized by a wearable terminal (an HMD, a transparent eyeglass-type wearable terminal (smart glasses), a smart band, a smart watch, a smart neck, or the like) worn by a user, a smartphone, a mobile phone terminal, a tablet terminal, a game machine, a music player, or the like. In addition, at least a part of the configuration shown in FIG. 3 may also be a separate body. Moreover, the user terminal 2 may further include a microphone or a speaker which is not shown.

3. OPERATION PROCESS

Next, an operation process of the information processing system according to the present embodiment will be described in detail with reference to FIGS. 5 to 15.

<3-1. First Operation Process>

Figure 5:
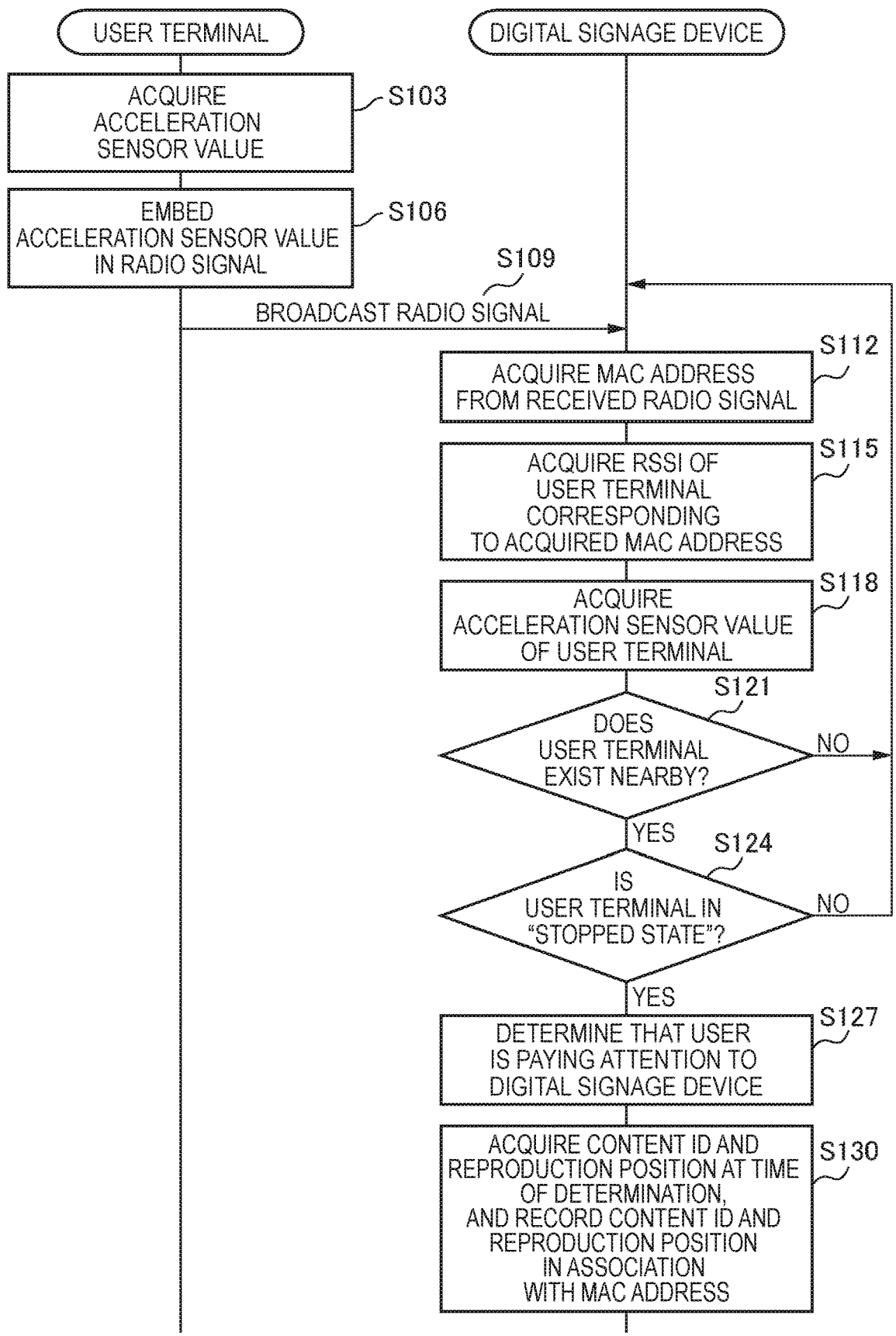
FIG. 5 is a sequence diagram which shows an operation process according to a first example of the present embodiment.

FIG. 5 is a sequence diagram which shows an operation process according to a first example of the present embodiment. Here, an acceleration sensor value is used as an example of sensor data. In addition, a probe request sent by a wireless LAN is used as an example of a radio signal.

As shown in FIG. 5, the user terminal 2 acquires an acceleration sensor value (step S103), embeds the acceleration sensor value in a radio signal (step S106), and broadcasts the radio signal (step S109). The steps S103 to S109 can be performed continuously by the user terminal 2.

Next, the digital signage device 1 continuously receives a radio signal using the radio signal receiving unit 11, and acquires an MAC address (identification information of a user terminal 2) from the received radio signal (step S112). The digital signage device 1 can acquire the MAC address of each user terminal 2 in a case in which multiple radio signals are received.

Then, the digital signage device 1 acquires an RSSI of a user terminal 2 corresponding to the acquired MAC address (step S115).

Next, the digital signage device 1 acquires an acceleration sensor value of the user terminal 2 from the received radio signal (step S118).

Next, the digital signage device 1 determines whether or not a user terminal 2 exists nearby on the basis of the RSSI acquired in step S115 described above (step S121). Specifically, for example, the determination unit 10*a* of the digital signage device 1 determines that a user terminal 2 corresponding to the RSSI exists nearby the digital signage device 1 in a case in which the RSSI exceeds a predetermined threshold value (for example, −20 dB). Note that 0 dB is set as the strongest (closest to the digital signage device 1) radio wave intensity in the present embodiment.

Next, in a case in which it is determined that the user terminal 2 exists nearby (Yes in step S121), the determination unit 10*a* determines whether or not the user terminal 2 is in a "stopped state" on the basis of the acceleration sensor value acquired in step S118 described above (step S124). Specifically, for example, the determination unit 10*a* determines that the user terminal 2 is in the stopped state in a case in which a magnitude of the acceleration sensor value has fallen below a threshold value at which the user terminal 2 can be determined to be "stopped" (or a case in which the acceleration sensor value falls below the threshold value continuously for a predetermined number of times (a predetermined time)).

Then, in a case in which it is determined that the user terminal 2 is in the stopped state (Yes in step S124), the determination unit 10*a* determines that a user is paying attention to the digital signage device 1 (step S127). As described above, in the present embodiment, it is determined that attention is being paid to a case in which the user terminal 2 stops close to the digital signage device 1. Moreover, the determination unit 10*a* can determine a degree of attention in accordance with more detailed user behavior such as a user relaxing a walking speed in the vicinity or quickly approaching in addition to a case of stopping. In addition, radio signals transmitted from the user terminal 2 may be broadcast at intervals of, for example, 50 msec, and the determination unit 10*a* can determine that a user is paying only slight attention to viewing content. In the present embodiment, since an optical-based sensor, a sensor for contact or proximity system, or the like is not used, it is possible to determine the degree of attention of a user in detail with high accuracy without there being an influence due to change in lighting conditions, rain, snow, or the like, or time and effort of a user being needed.

Next, the digital signage device 1 acquires the content ID and the reproduction position of content being reproduced when it is determined that a user is paying attention, and stores it in association with the MAC address (step S130). As a result, it is possible to aggregate information regarding who is paying attention to which content, the number of people paying attention to the content, and the like. In addition, accumulated data may be fed back to an advertisement company.

In the example described above, transmission of radio signals on the user terminal 2 side and analysis of radio signals on the digital signage device 1 side are continuously performed, respectively. As a result, the digital signage device 1 can ascertain motions before and after a user pays attention to content. In the example described above, the content ID and the reproduction position at the time of determination are stored in association with the MAC address, but motions of the user terminal 2 before and after determination (acceleration sensor values) may also be stored. As a result, it is also possible to acquire a change in state of a user paying attention to content.

In addition, although the acceleration sensor value is used as an example of the user state data in the operation process described above, the present embodiment is not limited thereto, and, for example, a behavior sensing determination result may also be used. That is, for example, in a case in which a behavior sensing function is provided on the user terminal 2 side, the user terminal 2 may perform behavior sensing on the basis of data obtained by a motion sensor and the like, and embed a result of the determination in a data row of a radio signal to broadcast it. In this case, the determination unit 10a of the digital signage device 1 can determine a state of the user terminal 2 according to a result of determining the state of the user terminal 2 acquired from a radio signal.

<3-2. Second Operation Process>

In the first example described above, attention determination is performed on the basis of user state data embedded in a radio signal, such as an acceleration sensor value, but the present embodiment is not limited thereto, and attention determination can be performed on the basis of, for example, a change in radio wave intensity of the user terminal 2. In the following description, specific description is performed with reference to FIG. 6.

Figure 6:
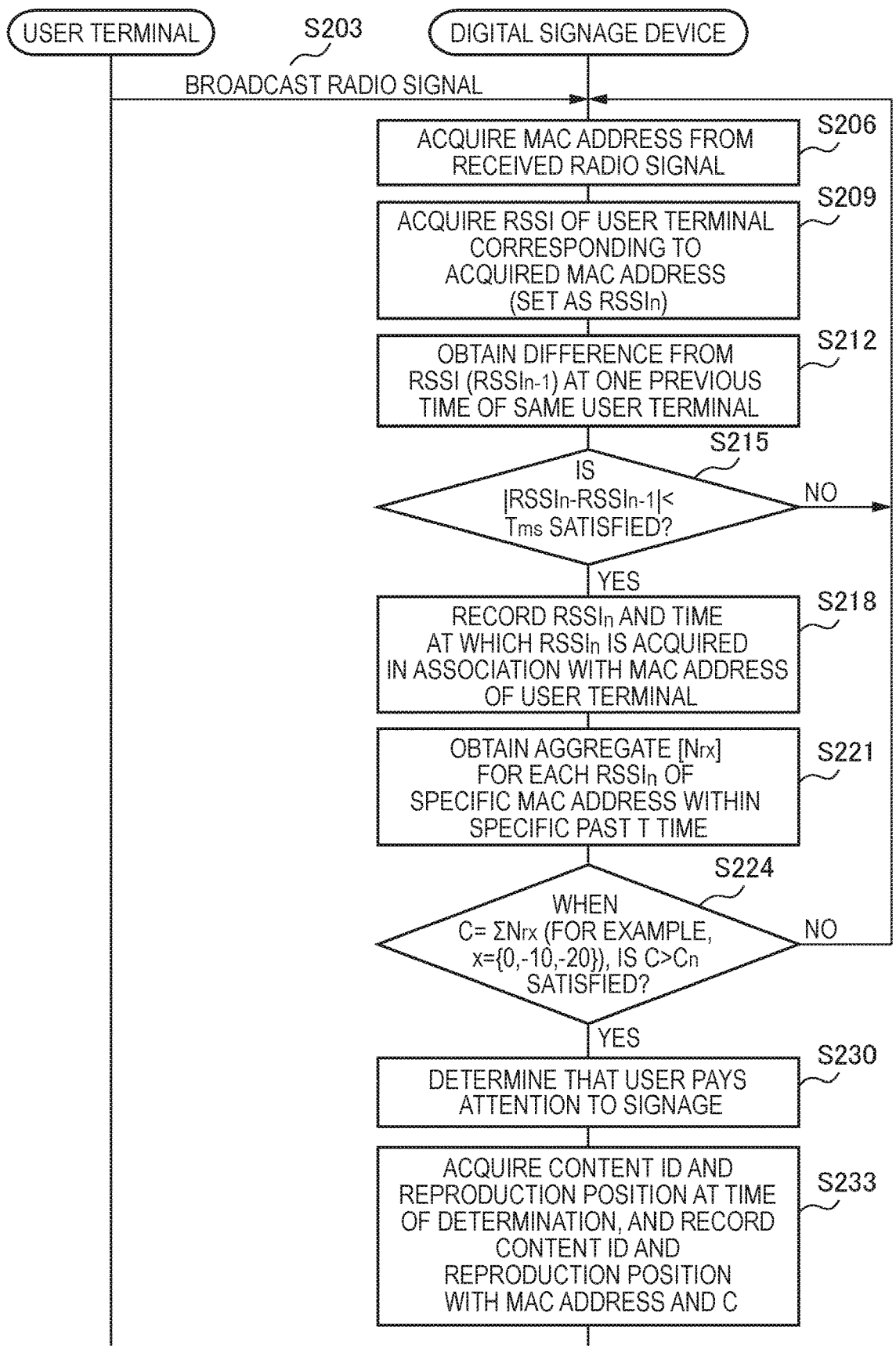
FIG. 6 is a sequence diagram which shows an operation process according to a second example of the present embodiment.

FIG. 6 is a sequence diagram which shows an operation process according to a second example. As shown in FIG. 6, the user terminal 2, first, broadcasts radio signals (probe request frames and advertising packets) continuously (step S203).

Next, the control unit 10 of the digital signage device 1 acquires an MAC address from a received radio signal (step S206).

Then, the control unit 10 acquires an RSSI of a user terminal 2 corresponding to the acquired MAC address (step S209). Here, an acquired RSSI is set as "$RSSI_n$."

Then, the control unit 10 obtains a difference from RSSI ($RSSI_{n-1}$) at one previous time of the same user terminal (MAC address) (step S212). The difference is calculated for each regular time (for example, every second).

Next, in a case in which $|RSSI_n-RSSI_{n-1}|<T_{ms}$ is satisfied (Yes in step S215), the control unit 10 records $RSSI_n$ and a time at which $RSSI_n$ is acquired in association with the MAC address of the user terminal 2 (step S218). Here, a threshold value "$T_{ms}$" is a threshold value for determining whether the user terminal 2 moves or stops, and, in a case in which a difference from RSSI ($RSSI_{n-1}$) at one previous time falls below the threshold value "$T_{ms}$", it can be determined that the user terminal 2 stops.

Next, the control unit 10 obtains an aggregate [$N_{rx}$] for each $RSSI_n$ of a specific MAC address within a specific past T time (step S221). Here, [ ] means an array, and x means radio wave intensity (dB). For example, when a range of RSSI is set to 10 dB, 0 dB level (0 to −10 dB), −10 dB level (−10 dB to −20 dB), −20 dB level (−20 dB to −30 dB), −30 dB level (−30 dB to −40 dB), −40 dB level (−40 dB to −50 dB), −50 dB level (−50 dB to −60 dB), −60 dB level (−60 dB to −70 dB), or −70 dB level (−70 dB or less), the number of times a radio signal of a specific MAC address (the MAC address of the user terminal 2 determined to stop at step S215 described above) is detected in one of these range within the past T time is obtained. Such a counting process is performed, for example, once per second.

Next, when $C=\Sigma N_{rx}$ (for example, x={0,−10,−20}), the control unit 10 determines whether or not $C>C_n$ is satisfied (step S224). $C_n$ is a threshold value of the number of counts of the user terminal 2 considered to stop very close to the digital signage (for example, in a predetermined range of radio wave intensity (0 dB to −20 dB)). The control unit 10 calculates a difference between past and current radio wave intensity for each regular time (for example, every second) in step S215 described above, and, in a case in which the value falls below the threshold value "$T_{ms}$", the user terminal 2 is considered to stop and is counted (the number of counts: C is incremented by 1). Therefore, herein, it is determined whether or not "stop" has been counted to a certain extent (fixed time). As a result, for example, it is possible to prevent attention determination for a user who has just passed by the front of the digital signage device 1.

Next, in a case in which it is determined that the user terminal 2 is in the stopped state to a certain extent (Yes in step S224), the determination unit 10a determines that a user pays attention to the digital signage device 1 (step S230).

Then, the digital signage device 1 acquires a content ID and a reproduction position of content reproduced when it is determined that a user pays attention, and stores it in association with the MAC address and the number of counts "C" (step S233). In the present embodiment, the number of counts may be treated as a degree of attention.

As described above, in the present embodiment, it is possible to detect an operation of approaching the digital signage device 1 and stopping, and to perform attention determination on the basis of a change in reception intensity of radio waves transmitted from the user terminal 2. Note that the digital signage device 1 according to the present embodiment may also perform attention determination to content in consideration of a change in heartbeat data of a user embedded in a radio signal in real time. For example, the determination unit 10a of the digital signage device 1 determines that the user pays attention to content being reproduced in the periphery of a time at which heartbeat information of the user included in the user state data of a radio signal is the highest.

<3-3. Third Operation Process>

Subsequently, in a case in which it is determined that a user pays attention to according to the first and second examples, the digital signage device 1 can change content in accordance with an attention of the user. As a result, for example, it is possible to increase an advertisement effect. Hereinafter, description will be described with reference to FIGS. 7 to 10.

Figure 7:
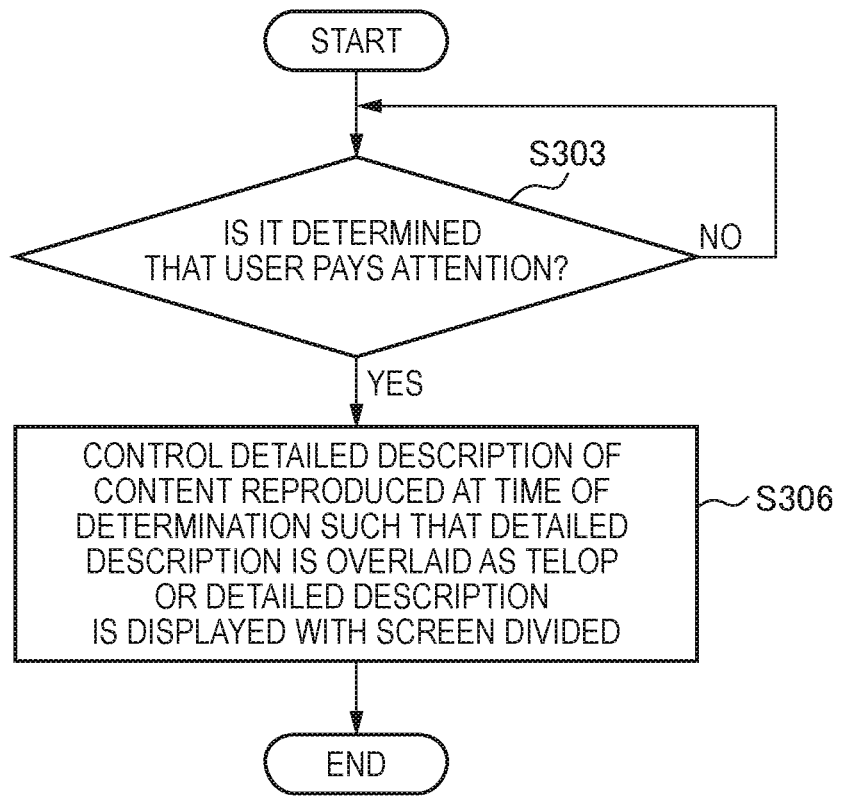
FIG. 7 is a flowchart which shows an operation process of switching to detailed content in accordance with a user's attention according to a third example of the present embodiment.

FIG. 7 is a flowchart which shows an operation process of switching to detailed content in accordance with a user's attention according to a third example. As shown in FIG. 7, if it is determined that a user pays attention to the digital signage device 1 according to the first or second example described above (Yes in step S303), the content control unit 10b of the digital signage device 1 controls detailed description of content reproduced at the time of determination such that the detailed description is overlaid as a telop or the detailed description is displayed with the screen divided. As a result, detailed information of content can be presented to a user paying attention thereto.

Note that detailed description of content to which a user pays attention is not limited to reproduction at the digital signage device 1, and may be reproduction at an information processing terminal on a user side in the present embodiment. For example, in a case in which a user wears an HMD or carries a smartphone, a smart watch, and the like, and in a case in which the digital signage device 1 embeds the detailed information in the data row of a radio signal and broadcasts it like the user terminal 2, a device on a user side can display the broadcast data (the detailed information) on a screen thereof. As a result, the digital signage device 1 can display, for example, an overview on the display unit 12 thereof, and display more detailed description on the user side. Moreover, a text may be converted into speech via voice data or a text-to-speech (TTS) on the user side in the detailed description, and, in this case, the detailed information is reproduced from a headphone or speaker of the device on the user side.

Figure 8:
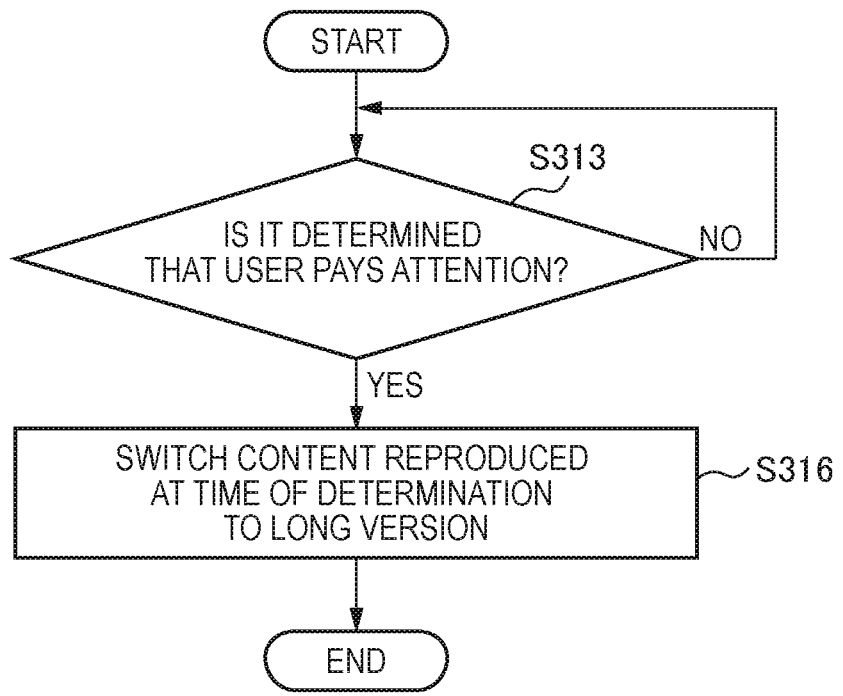
FIG. 8 is a flowchart which shows an operation process of switching to long content in accordance with a user's attention according to a third example of the present embodiment.

FIG. 8 is a flowchart which shows an operation process of switching into long version content in accordance with a user's attention according to a third example. As shown in FIG. 8, if it is determined that a user pays attention to the digital signage device 1 according to the first or second example described above (Yes in step S313), the content control unit 10*b* of the digital signage device 1 performs control such that content being reproduced at the time of determination is switched to long version content.

Figure 9:
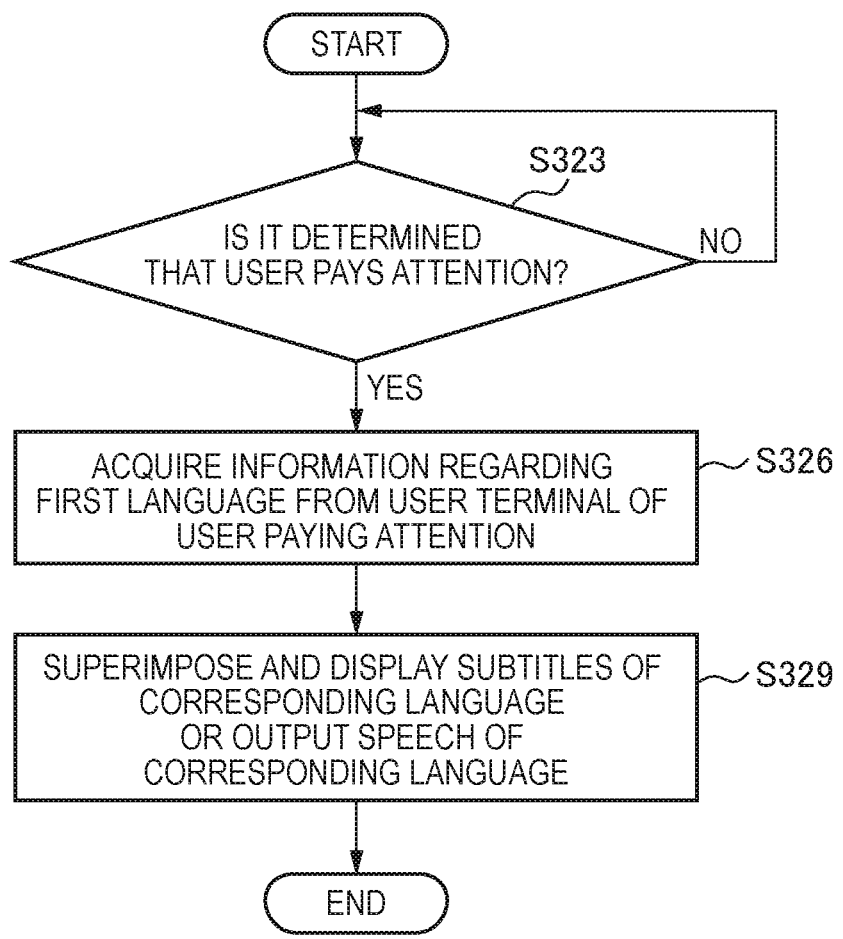
FIG. 9 is a flowchart which shows an operation process of switching between languages of content in accordance with a user's attention according to a third example of the present embodiment.

FIG. 9 is a flowchart which shows an operation process of switching languages of content in accordance with a user's attention according to the third example. As shown in FIG. 9, if it is determined that a user pays attention to the digital signage device 1 according to the first or second example (Yes in step S323), the digital signage device 1 acquires information regarding a first language from the user terminal 2 of the user paying attention (step S326). The information regarding a first language may be embedded, for example, in the data row of a radio signal in the same manner as the user state data, and may also be acquired by the digital signage device 1 requesting with respect to a target user terminal 2.

Next, the content control unit 10*b* superimposes and displays subtitles of a corresponding language, or outputs a sound of the corresponding language (step S329).

Note that, in a case in which there are a plurality of users determined to pay attention, switching control of content may also be performed by majority vote. In addition, in a case in which, for example, the number of users paying attention is 10, and an aggregate result by a first language of these users is Japanese 4, English 2, Chinese 2, and German 2, the content control unit 10*b* may display a main voice in Japanese, and displays subtitles in English, Chinese, and German. In addition, in a case in which a plurality of peripheral digital signage devices 1 are interlocked with each other, the content control unit 10*b* may perform allocation control such that each digital signage device 1 outputs voices of respective languages.

Figure 10:
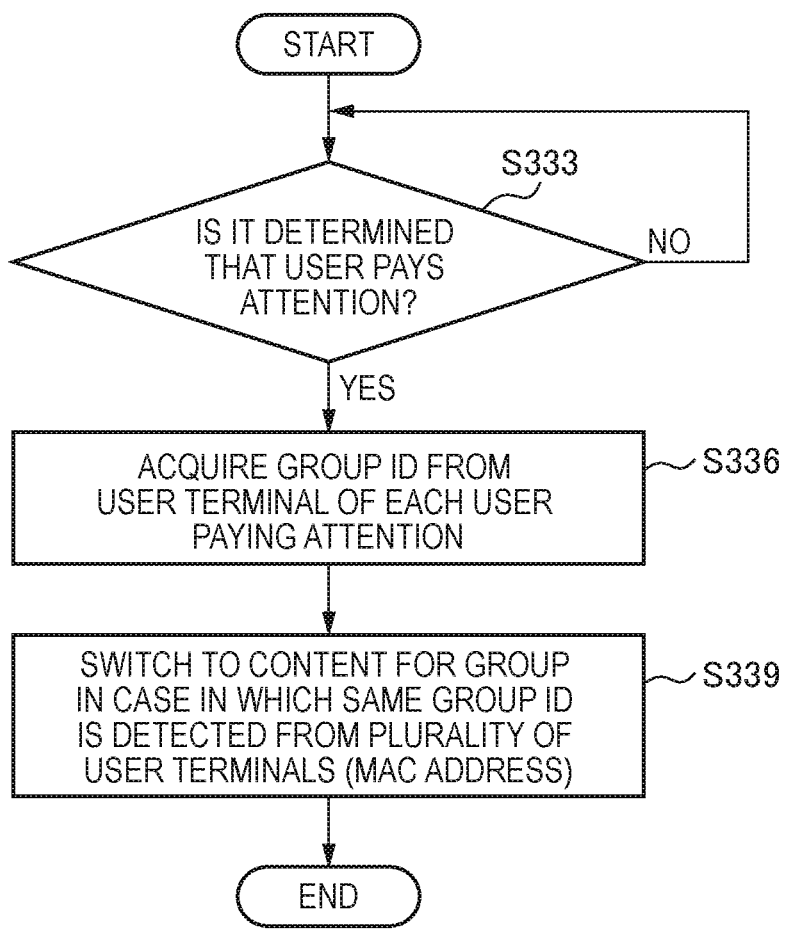
FIG. 10 is a flowchart which shows an operation process of switching to content for a group in accordance with a user's attention according to the third example of the present embodiment.

FIG. 10 is a flowchart which shows an operation process of switching to content for a group in accordance with a user's attention according to the third example. As shown in FIG. 10, if it is determined that a user pays attention to the digital signage device 1 according to the first or second embodiment described above (Yes in step S333), the digital signage device 1 acquires a group ID from a user terminal 2 of each user paying attention thereto (step S336).

Next, the content control unit 10*b* changes to the content for a group in a case in which the same group ID is detected from a plurality of user terminals 2 (which can be identified using MAC addresses) (step S339). As a result, for example, it is possible to perform effective content reproduction for each group such as family, friends, or lovers. Note that, for example, if different types of group IDs are detected (in a case in which there are a plurality of groups), the content control unit 10*b* can change to content for a group which has the most number by majority vote. For example, the content control unit 10*b* changes to content for family in a case in which a family group is four, a friend group is two, and a lover group is one.

<3-4. Fourth Operation Process>

In addition, the information processing system according to the present embodiment can issue a coupon key to a user paying attention to content. A user can use the coupon key at the time of purchasing an advertising product introduced in the content in the Internet and the like. As a result, an advertisement effect can also be measured. Hereinafter, specific description will be provided with reference to FIG. 11.

Figure 11:
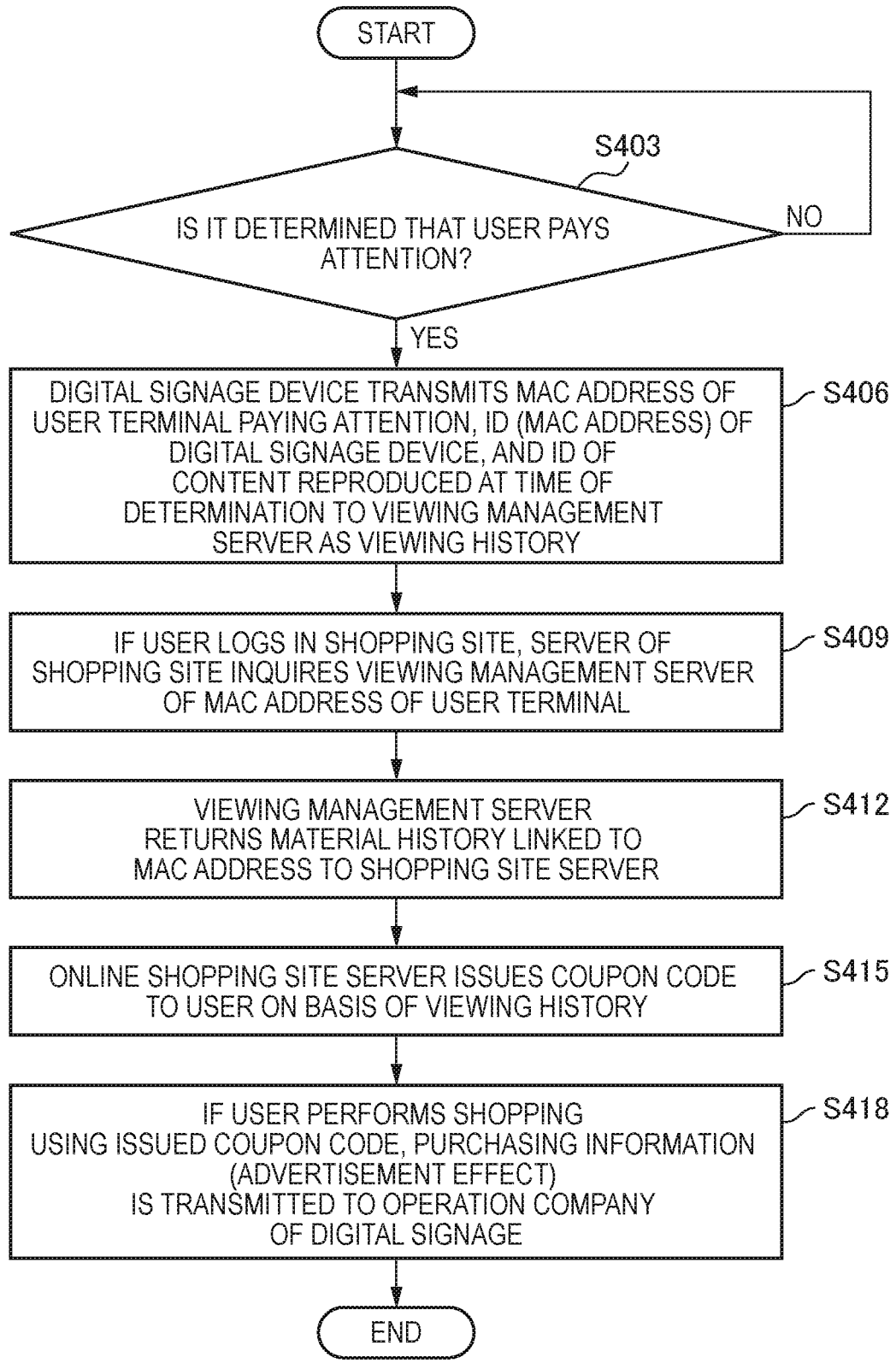
FIG. 11 is a flowchart which shows a coupon issuing operation process according to a fourth example of the present embodiment.

FIG. 11 is a flowchart which shows an operation process at the time of issuing a coupon according to a fourth example of the present embodiment. In the present embodiment, the MAC address of the user terminal 2 is registered in advance in a purchase management service on the cloud side.

As shown in FIG. 11, first, if a user is determined to pay attention to the digital signage device 1 according to the first or second example described above (Yes in step S403), the digital signage device 1 transmits the MAC address of a user terminal 2 of the user paying attention thereto, the ID (the MAC address) of the digital signage device, and an ID of content being reproduced at the time of determination to a viewing management server (not shown) of the cloud as viewing history (step S406).

Next, if the user logs in to a shopping site using the user terminal 2, a server of the shopping site transmits the MAC address of the user terminal 2 to the viewing management server and makes an inquiry (step S409).

Next, the viewing management server returns material history linked to the inquired MAC address to the shopping site server (step S412).

Next, an online shopping site server issues a coupon code to the user (the user terminal 2) on the basis of the viewing history (step S415).

Then, if the user performs shopping at the shopping site using the issued coupon code, for example, purchasing information (advertisement effect) is transmitted to an operation company of the digital signage device 1 (step S418).

Note that a process of issuing a coupon is not limited to a method via a server on the cloud as described above, and the digital signage device 1 can also issue a coupon of an advertisement product and the like directly to the user terminal 2. Hereinafter, description will be provided with reference to FIGS. 12 and 13.

Figure 12:
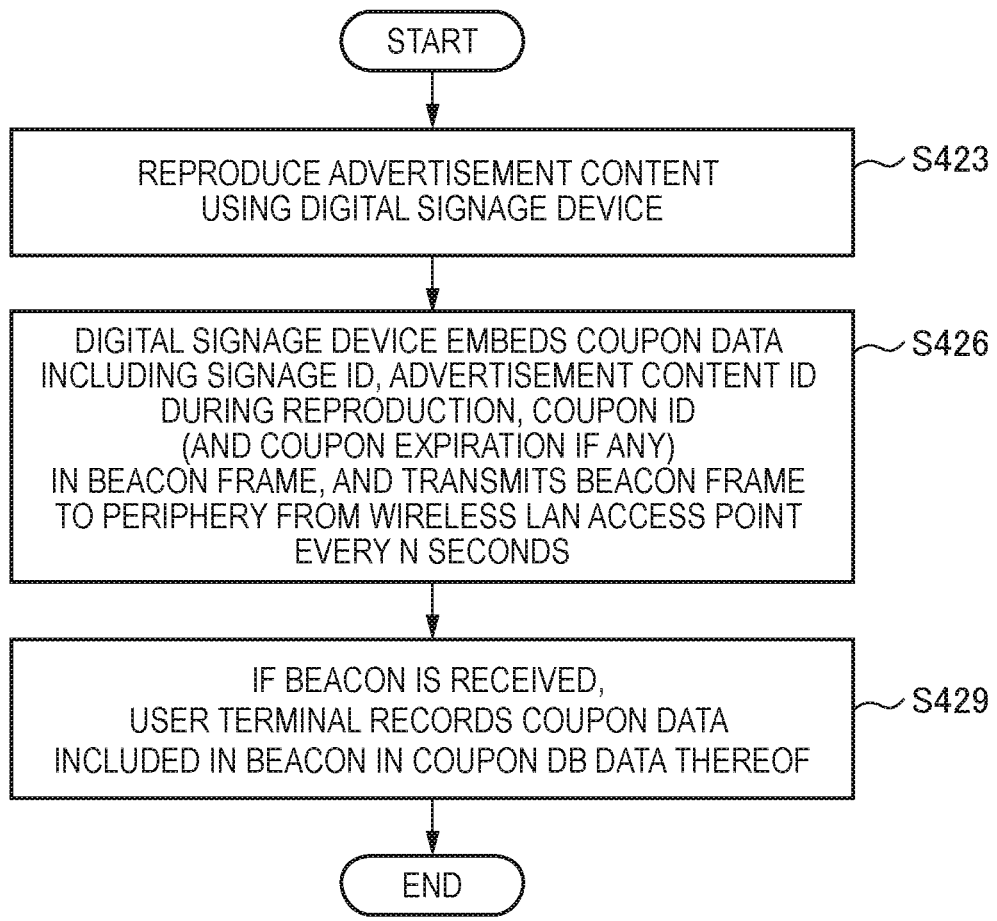
FIG. 12 is a flowchart which shows another coupon issuing operation process according to the fourth example of the present embodiment.

FIG. 12 is a flowchart which shows another coupon issuing operation process according to a fourth example of the present embodiment. As shown in FIG. 12, the digital signage device 1, first, reproduces advertisement content (step S423).

Next, the digital signage device 1 embeds coupon data including a signage ID, an advertisement content ID during reproduction, a coupon ID (and coupon expiration if any) in a radio signal such as a beacon frame, and broadcast-transmits the radio signal from a radio signal communication unit every N seconds (step S426). For example, the digital signage device 1 embeds "coupon: AAAA-BBBB-CCCC"

(AAAA: signage ID, BBBB: advertisement content ID, CCCC: coupon ID) as coupon data.

Then, if a beacon is received, the user terminal 2 records coupon data included in the beacon in a coupon DB (the storage unit 24) thereof (step S429).

As a result, it is possible to directly issue a coupon to a user passing nearby. Note that the digital signage device 1 may also transmit a radio signal such as a beacon embedded with a coupon code from the radio signal communication unit when attention determination is performed according to the first and second examples.

Figure 13:
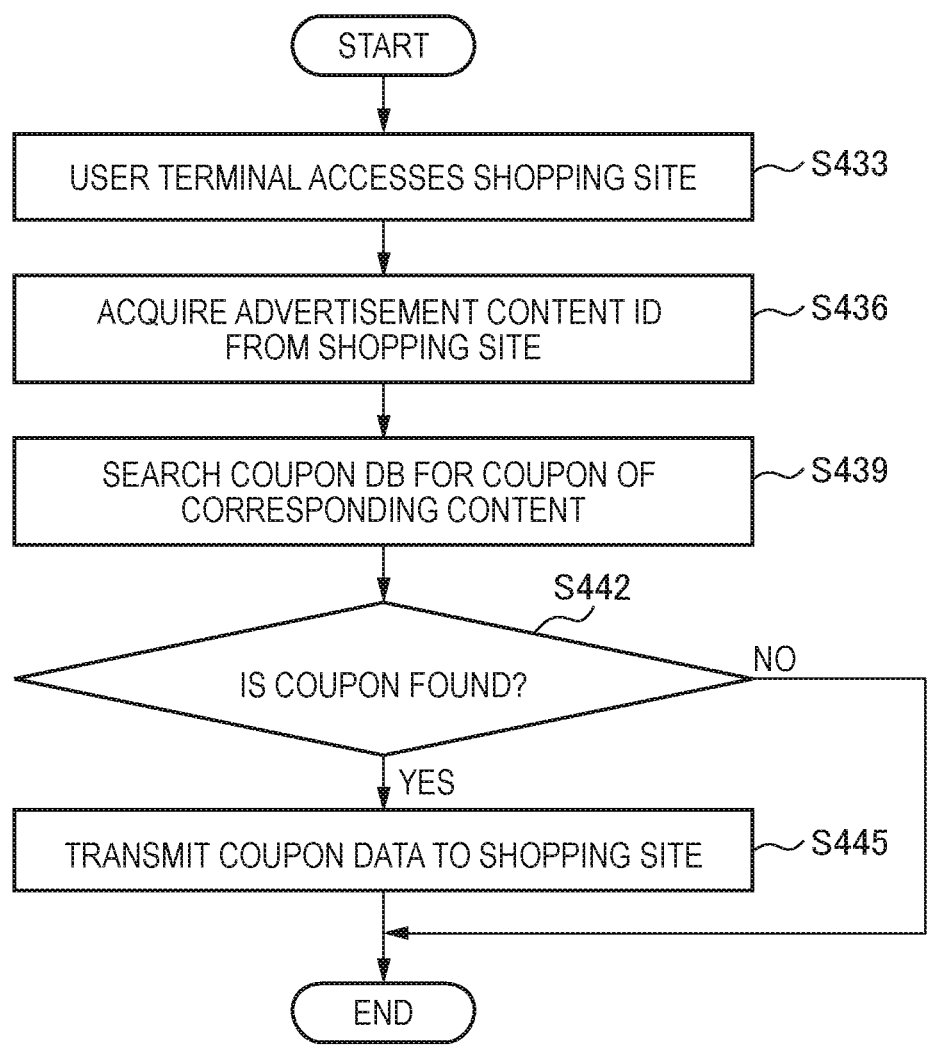
FIG. 13 is a flowchart which shows an operation process at the time of using a coupon acquired in the process shown in FIG. 12.

Next, the use of a coupon issued as described above will be described with reference to FIG. 13. As shown in FIG. 13, first, the user terminal 2 acquires the advertisement content ID from the shipping site (step S436) if it accesses the shopping site (step S433).

Next, the user terminal 2 searches for a coupon of content corresponding to the advertisement content from a coupon DB (step S439).

Then, if a coupon is found (Yes in step S442), the user terminal 2 transmits coupon data to a shopping site (step S445). As a result, a user can perform shopping using the coupon. In addition, at this time, since a signage ID is also included in the coupon data, a shopping site server may transmit purchasing information (advertisement effect) to an operation company of the digital signage device 1 together with a signage ID when shopping is performed using the coupon.

<3-5. Supplement>

As described above, the information processing system according to the present embodiment has been described using several examples. Subsequently, supplements of the present embodiment will be described.

As described above, since a content ID and a reproduction position at the time of attention determination are accumulated, the digital signage device 1 can output a fact that to which content (further, to which scene) attention has been paid to which extent (the number of people paying attention and attention time) to mainly the operation company or advertiser of the digital signage device 1 as a result of the determination. However, the output of the attention determination result is not limited to this example, and it is possible to output, for example, detailed information such as a change in biometric information or emotion information of a user paying attention. Hereinafter, such a modified example of the present embodiment will be described, respectively, with reference to FIGS. 14 and 15.

(3-5-1. Generation of Graph Showing Change in Heartbeat)

Figure 14:
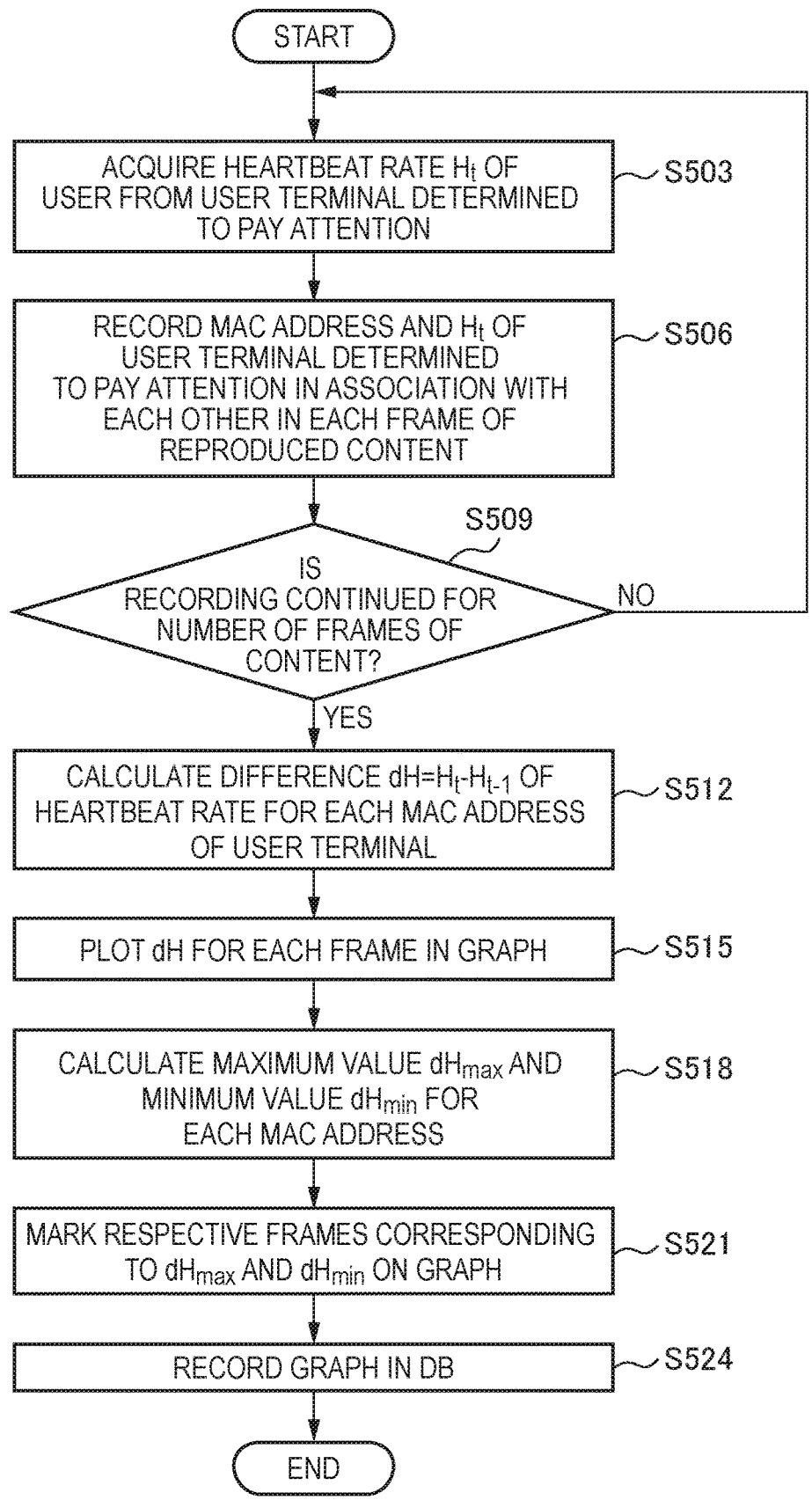
FIG. 14 is a flowchart which shows a process of generating a graph showing a change in heartbeat according to a first modified example of the present embodiment.

FIG. 14 is a flowchart which shows a process of generating a graph showing a change of heartbeat according to a first modified example. As shown in FIG. 14, the digital signage device 1, first, acquires the number of heartbeat rate $H_t$ of a user from one or more user terminals 2 determined to pay attention according to the first or second embodiment (step S503). Data of the heartbeat rate $H_t$ can be embedded in a data row of a radio signal in the same manner as user state data, and be continuously broadcast, for example. The digital signage device 1 performs identification of a user terminal 2 according to the MAC address, and acquires the heartbeat rates $H_t$ of one or more user terminals 2 which are determined to pay attention.

Next, the control unit 10 of the digital signage device 1 records the MAC addresses and heartbeat rates $H_t$ of one or more user terminals 2 determined to pay attention in association with each other for each content frame being reproduced (step S506).

Next, if recording of the heartbeat rate $H_t$ of the user paying attention is continued for the number of frames of content (Yes in step S509), the difference $dH=H_t-H_{t-1}$ of the heartbeat rate for each MAC address of a user terminal 2 is calculated by the control unit 10 (step S512). Here, $H_t$ is a current heartbeat rate, and $H_{t-1}$ is a heartbeat rate of one previous time.

Next, the control unit 10 plots a heartrate difference dH for each frame in a graph (step S515).

Next, the control unit 10 calculates a maximum value $dH_{max}$ and a minimum value $dH_{min}$ for each MAC address (step S518).

Next, the control unit 10 marks respective frames corresponding to the maximum value $dH_{max}$ and the minimum value $dH_{min}$ on a graph (step S521).

Then, the control unit 10 records the graph in a DB (the storage unit 14) (step S524).

As a result, it is possible to generate a graph showing a change in heartbeat of a user paying attention for each frame of content. Such a graph is mainly output to an operation company of the digital signage device 1 or an advertiser, and is used for measurement of a degree of attention. Moreover, by marking the maximum value $dH_{max}$ and the minimum value $dH_{min}$, it is possible to intuitively ascertain a place at which the heartbeat rate has suddenly risen and a place at which the heartbeat rate has suddenly declined.

Note that a differential value of the heartbeat rate ($\approx$ a difference dH for each unit time) is calculated and plotted in a graph herein, but the present embodiment is not limited thereto, and, for example, an average value of the heartbeat rates of one or more users paying attention for each unit time may be calculated and plotted in a graph.

(3-5-2. Generation of Graph Showing Change in User Emotion)

FIG. 15 is a flowchart which shows a process of generating a graph showing a change in user emotion according to a second modified example.

As shown in FIG. 15, the user terminal 2, first, acquires a current user emotion from an UI (step S533). For example, the user terminal 2 displays a selection screen for selecting a current user emotion (or only a button for inputting a pleasant emotion) on the display unit 23, and causes a user to tap. Alternatively, for example, a physical button for inputting a pleasant emotion of a user may also be provided in the user terminal 2.

Next, the user terminal 2 embeds the acquired user emotion in a radio signal and broadcasts the signal (step S536).

Next, the control unit 10 of the digital signage device 1 plots each emotion using a stacked graph (step S539). For example, the control unit 10 generates a stacked graph for each acquired user emotion with a horizontal axis as a frame number of content.

Then, processes in steps S533 to S539 described above are repeated while content is reproduced (step S542). As a result, a graph from which it can be known using micro and macro what kinds of emotion a user has at a position of content is generated.

(3-5-3. At the Time of Wearing Eyeglass-Type HMD)

When a user wears an eyeglass-type HMD, and a radio signal embedded with position information, height information (height), direction information of a face is transmitted from the eyeglass-type HMD, the digital signage device 1 can perform attention determination on the basis of these pieces of information acquired from the received radio signal.

(3-5-4. Update of Personal Information)

In addition, in a case in which radio signal information and personal information are linked on a cloud side (for example, in a case in which a MAC address and a user ID are linked), the digital signage device 1 can also update preference of personal information in accordance with a degree of attention to advertisement content. Moreover, a result of the attention determination may be returned to the user terminal 2 and the preference may also be updated on the user terminal 2 side.

(3-5-5. Link)

In addition, it is possible to cause the plurality of digital signage devices 1 to be linked in accordance with a user who pays attention. For example, a user who pays attention to a first digital signage device 1a may be subjected to content control such as making content of a peripheral second digital signage device 1b the same as or different from the first digital signage device 1a, or deliberately not allowing advertisement to flow.

4. CONCLUSION

As described above, in the information processing system according to the embodiment of the present disclosure, it is possible to measure a degree of attention to content in a more detailed manner.

In the present embodiment, it is possible to measure degrees of attention of multiple users to the digital signage device 1 publicly installed as an electronic advertisement signboard in real time without using an optical-based sensor, a sensor for contact or proximity system, or the like. Therefore, the degrees of attention of users which are far away that a camera hardly capture them or overlap each other can be detected. In addition, although a normal camera has low accuracy under direct sunlight or in dark places, using radio signals makes it possible to perform attention determination with high accuracy in the present embodiment.

In addition, since radio signals are broadcast at intervals of, for example, 50 msec, and accuracy or sampling intervals are sufficient for a moving speed and distance of a human body in the present embodiment, it is possible to determine even a momentary attention such as stopping a motion by slightly looking at content.

In addition, content can be changed in accordance with attention determination. As a result, it is possible to increase an advertisement effect of advertisement content. In addition, the digital signage device 1 can control advertisement content in accordance with, for example, biometric information or emotion data embedded in a radio signal. As a result, for example, in a case in which a user who is determined to pay attention drinks too much and has a bad physical condition, measurement such as giving advertisement of gastrointestinal medicine instead of advertisement of liquor can be taken.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing a function of the digital signage device 1 or the user terminal 2 to be displayed can also be created in hardware such as a CPU, a ROM, and a RAM which are embedded in the digital signage device 1 described above or the user terminal 2. In addition, a computer readable storage medium which causes the computer program to be stored therein is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A content output system including:

a communication unit which receives a signal from a surrounding user device;

an output unit which outputs content; and a control unit which determines, on the basis of user state data indicating a state of a user corresponding to a user device, which is included in a broadcast signal from the user device, that the user corresponding to the user device is paying attention to content output by the output unit when a radio wave intensity of the received signal is equal to or higher than a predetermined value.

(2)

The content output system according to (1), in which the control unit determines that the user device has stopped in a vicinity of the content output system in accordance with motion information included in the user state data, and determines that the user corresponding to the user device is paying attention to the content output by the output unit.

(3)

The content output system according to (1), in which the control unit determines that the user corresponding to the user device has stopped in a vicinity of the content output system on the basis of state data as a result of behavior recognition in the user device included in the user state data, and determines that the user corresponding to the user device is paying attention to the content output by the output unit.

(4)

The content output system according to any one of (1) to (3), in which the control unit changes the content output by the output unit if it is determined that the user corresponding to the user device is paying attention to the content output by the output unit on the basis of the user state data.

(5)

The content output system according to (4), in which the control unit displays the content output by the output unit together with a detailed description of the content as a change of the content.

(6)

The content output system according to (4), in which the control unit switches the content output by the output unit to a long version as a change of the content.

(7)

The content output system according to (4), in which, in a case in which first language information which makes it possible to estimate a first language of the user corresponding to the user device is acquired from a signal of the user device, the control unit outputs the content output by the output unit and a description of the content in the first language as a change of the content.

(8)

The content output system according to (4), in which, in a case in which a same group ID is detected from signals of a plurality of the user devices, the control unit switches the content output by the output unit to content for a group as a change of the content.

(9)

The content output system according to (7), in which, in a case in which different pieces of first language information are acquired from signals of a plurality of user devices, the control unit outputs the description of the content using a most common language.

(10)

The content output system according to (8), in which, in a case in which group IDs are detected from signals of a plurality of user devices, the control unit switches to content for a most common group.

(11)

The content output system according to any one of (1) to (10), in which, if it is determined that the user corresponding to the user device is paying attention to the content output by the output unit on the basis of the user state data, the control unit transmits a coupon valid at a time of a purchase of the content, which includes identification information of the content output system, from the communication unit.

(12)

The content output system according to any one of (1) to (11), in which the control unit determines that the user is paying attention to the content output by the output unit near a time at which heartbeat information of the user included in the user state data is highest.

(13)

The content output system according to any one of (1) to (12), in which the control unit determines that the user device has stopped in a vicinity of the content output system in accordance with a change of radio wave intensity of the received signal, and determines that the user corresponding to the user device is paying attention to the content output by the output unit.

(14)

The content output system according to any one of (1) to (13), in which the control unit aggregates the user state data of one or more users who are determined to be paying attention to content output to the output unit for each unit time, and generates data indicating a result of the aggregation for each frame of the content.

(15)

A terminal device including:

a communication unit which transmits a broadcast signal;

a sensor which senses a state of a user and generates sensing data; and a control unit which performs control to generate user state data on the basis of the sensing data generated by the sensor, and to embed the user state data in the broadcast signal and broadcast the broadcast signal via the communication unit.

(16)

The terminal device according to (15), in which the sensor senses a motion of a user, and generates motion data.

(17)

The terminal device according to (15) or (16), in which the sensor senses a heartbeat of a user and generates heartbeat data.

(18)

The terminal device according to any one of (15) to (17), in which the control unit receives a coupon valid at a time of a purchase of content, which includes identification information of a content output device from the content output device via the communication unit.

(19)

A content output method including, by a processor:

outputting content from an output unit; and determining, on the basis of user state data indicating a state of a user corresponding to a user device, which is included in a broadcast signal from the user device, that the user corresponding to the user device is paying attention to content output by the output unit when a radio wave intensity of a signal received by a communication unit which receives a signal from a surrounding user device is equal to or higher than a predetermined value.

(20)

A storage medium having a program recorded thereon, the program causing a computer to function as a communication unit which transmits a broadcast signal, a sensor which senses a state of a user and generates sensing data, and a control unit which performs control to generate user state data on the basis of the sensing data generated by the sensor, and to embed the user state data in the broadcast signal and broadcast the broadcast signal via the communication unit.

REFERENCE SIGNS LIST 1 digital signage device
2 user terminal
10 control unit
10a determination unit
10b content control unit
11 radio signal receiving unit
12 display unit
13 network communication unit
14 storage unit
20 control unit
21 sensor
22 radio signal transmission unit
23 display unit
24 storage unit
25 operation input unit
26 network communication unit

The invention claimed is:

1. A content output system, comprising:

a display device configured to output content; and circuitry, coupled with the display device, configured to:

receive a signal from a user device, wherein the received signal includes user state data that indicates a state of a user corresponding to the user device, and the user state data includes heartbeat information of the user;

determine a change of a radio wave intensity of the received signal;

determine that the user device has stopped in a vicinity of the content output system based on the change of the radio wave intensity of the received signal is less than a first threshold value for a time period;

determine that the user corresponding to the user device is in the vicinity of the display device based on:
the radio wave intensity of the received signal is equal to or higher than a second threshold value, and
the determination that the user device has stopped in the vicinity of the content output system;
determine that the user is paying attention to the content at a specific reproduction position of the content based on a change in the heartbeat information at a specific time, wherein the specific time corresponds to the specific reproduction position of the content;
control display of the content with a detailed description of the content based on the determination that the user is paying attention to the content;
acquire language information from the received signal, wherein
the language information is acquired based on the determination that the user is paying attention to the content, and
the language information indicates a first language of the user;
superimpose subtitles of the content in the first language, wherein the subtitles are superimposed on the displayed content;
output voice associated with the content in the first language; and
control transmission of a coupon that is valid at a time of a purchase of the content, wherein the transmission of the coupon is controlled based on the determination that the user is paying attention to the content.

2. The content output system according to claim 1, wherein the circuitry is further configured to:
determine that the user device has stopped in the vicinity of the content output system based on motion information included in the user state data; and
determine that the user corresponding to the user device is paying attention to the content based on the determination that the user device has stopped in the vicinity of the content output system.

3. The content output system according to claim 1, wherein the circuitry is further configured to:
determine that the user corresponding to the user device has stopped in the vicinity of the content output system based on state data, wherein the state data corresponds to behavior recognition that is included in the user state data; and
determine that the user corresponding to the user device is paying attention to the content based on the behavior recognition included in the user state data.

4. The content output system according to claim 1, wherein the circuitry is further configured to control change of the content based on the determination that the user corresponding to the user device is paying attention to the content.

5. The content output system according to claim 4, wherein the circuitry is further configured to control switch of the content to a long version as the change of the content.

6. The content output system according to claim 4, wherein, in a case in which a same group ID is detected from signals of a plurality of user devices, the circuitry is further configured to control switch of the content to specific content for a group as the change of the content.

7. The content output system according to claim 1, wherein, in a case in which different pieces of the language information are acquired from signals of a plurality of user devices, the circuitry is further configured to control the output of the detailed description of the content in a most common language.

8. The content output system according to claim 6, wherein, in a case in which group IDs are detected from the signals of the plurality of user devices, the circuitry is further configured to control switch of the content to the specific content for a most common group.

9. The content output system according to claim 1, wherein the coupon comprises identification information of the content output system.

10. The content output system according to claim 1, wherein the circuitry is further configured to determine that the user is paying attention to the content at a time at which the heartbeat information of the user is highest.

11. The content output system according to claim 1, wherein the circuitry is further configured to:
control aggregation of the user state data of a plurality of users who are determined to be paying attention to the content for each unit time, and
generate data indicating a result of the aggregation for each frame of the content.

12. A terminal device, comprising:
a sensor configured to:
detect a state of a user; and
generate sensing data based on the detected state of the user; and
circuitry configured to:
generate user state data based on the generated sensing data, wherein the user state data comprises heartbeat information associated with the user;
embed the user state data in a broadcast signal; and
control transmission of the broadcast signal to a content output device that displays content, wherein
the content output device is an external device, and
the content output device:
determines a change of a radio wave intensity of the broadcast signal,
determines that the user corresponding to the terminal device has stopped in a vicinity of the content output device based on the change of the radio wave intensity of the broadcast signal is less than a first threshold value for a time period,
determines that the user corresponding to the terminal device is in the vicinity of the content output device based on:
the radio wave intensity of the broadcast signal is equal to or higher than a second threshold value, and
the determination that the user corresponding to the terminal device has stopped in the vicinity of the content output device,
determines that the user is paying attention to the content at a specific reproduction position of the content based on a change in the heartbeat information at a specific time, wherein the specific time corresponds to the specific reproduction position of the content,
acquires language information from the broadcast signal, wherein
the language information is acquired based on the determination that the user is paying attention to the content, and
the language information indicates a first language of the user, superimposes subtitles of the content in the first language, wherein the subtitles are superimposed on the content,
outputs voice associated with the content in the first language, and
transmits a detailed description of the content with superimposed subtitles of the content in the first language of the user, wherein the transmission is based on the determination that the user is paying attention to the content;
control reproduction of the detailed description of the content that is displayed on the content output device; and
control reception of a coupon that is valid at a time of a purchase of the content.

13. The terminal device according to claim 12, wherein the sensor is further configured to:
detect a motion of the user; and
generate motion data based on the detected motion of the user.

14. The terminal device according to claim 12, wherein the sensor is further configured to:
detect a heartbeat of the user; and
generate the heartbeat information based on the detected heartbeat of the user.

15. The terminal device according to claim 12, wherein the coupon includes identification information of the content output device.

16. A content output method, comprising:
in a content output system:
receiving a signal from a user device, wherein
the received signal includes user state data that indicates a state of a user corresponding to the user device, and
the user state data includes heartbeat information of the user;
outputting, by a processor, content on a display device;
determining a change of a radio wave intensity of the received signal;
determining that the user device has stopped in a vicinity of the content output system based on the change of the radio wave intensity of the received signal is less than a first threshold value for a time period;
determining, by the processor, that the user corresponding to the user device is in the vicinity of the display device based on:
the radio wave intensity of the signal received from the user device is equal to or higher than a second threshold value, and
the determination that the user device has stopped in the vicinity of the content output system;
determining, by the processor, that the user is paying attention to the content at a specific reproduction position of the content based on a change in the heartbeat information at a specific time, wherein the specific time corresponds to the specific reproduction position of the content;
controlling, by the processor, display of the content with a detailed description of the content based on the determination that the user is paying attention to the content;
acquiring language information from the received signal, wherein
the language information is acquired based on the determination that the user is paying attention to the content, and
the language information indicates a first language of the user;
superimposing subtitles of the content in the first language, wherein the subtitles are superimposed on the displayed content;
outputting voice associated with the content in the first language; and
controlling transmission of a coupon that is valid at a time of a purchase of the content, wherein the transmission of the coupon is controlled based on the determination that the user is paying attention to the content.

17. A non-transitory computer-readable medium having stored thereon, computer-executable instructions which, when executed by a computer, cause the computer to execute operations, the operations comprising:
detecting a state of a user to generate sensing data; and
generating user state data based on the generated sensing data, wherein the user state data comprises heartbeat information associated with the user;
embedding the user state data in a broadcast signal;
broadcasting the broadcast signal to a content output device that displays content, wherein
the content output device is an external device, and
the content output device:
determines a change of a radio wave intensity of the broadcast signal;
determines that the user corresponding to a user device has stopped in a vicinity of the content output device based on the change of the radio wave intensity of the broadcast signal is less than a first threshold value for a time period;
determines that the user corresponding to the user device is in the vicinity of the content output device based on:
the radio wave intensity of the broadcast signal is equal to or higher than a second threshold value, and
the determination that the user corresponding to the user device has stopped in the vicinity of the content output device,
determines that the user is paying attention to the content at a specific reproduction position of the content based on a change in the heartbeat information at a specific time, wherein the specific time corresponds to the specific reproduction position of the content,
acquires language information from the broadcast signal, wherein
the language information is acquired based on the determination that the user is paying attention to the content, and
the language information indicates a first language of the user, superimposes subtitles of the content in the first language, wherein
the subtitles are superimposed on the content,
outputs voice associated with the content in the first language, and
transmits a detailed description of the content with superimposed subtitles of the content in the first language of the user, wherein the transmission is based on the determination that the user is paying attention to the content;
controlling reproduction of the detailed description of the content that is displayed on the content output device; and controlling reception of a coupon that is valid at a time of a purchase of the content.

18. The content output system according to claim 1, wherein the circuitry is further configured to determine that the user device has stopped in the vicinity of the content output system based on a magnitude of an acceleration sensor value in the received signal is below a third threshold value for a period of time.

* * * * *